M. M. McINTYRE.
VEHICLE SPRING.
APPLICATION FILED APR. 25, 1907.

1,083,022.

Patented Dec. 30, 1913.

Witnesses:
A. L. Lord.
Brennan B. West.

Inventor,
Michael M. McIntyre
By Bates, Fouts & Hull,
Attorneys.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,083,022.  Specification of Letters Patent.  Patented Dec. 30, 1913.

Application filed April 25, 1907. Serial No. 370,165.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

My invention relates to vehicle springs, and has for its object to produce a spring in which strength and resiliency are combined, securing ease of riding under light and heavy loads and successfully withstanding the shocks and strains and other incidents of use. I attain these objects by the embodiments of my invention shown herein, wherein—

Figure 1:
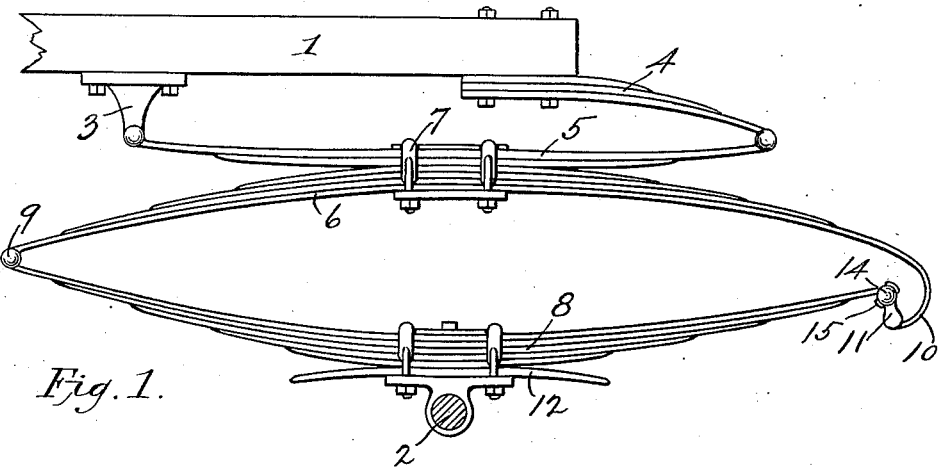
Figure 2:
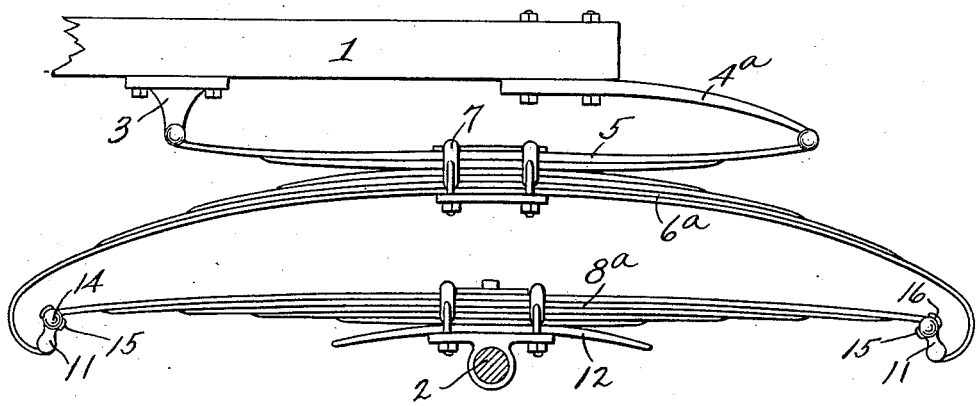
Figure 3:
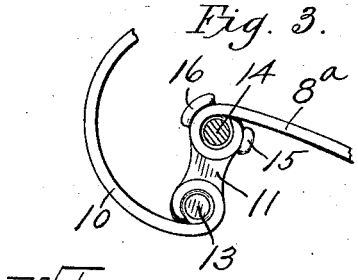
Figure 4:
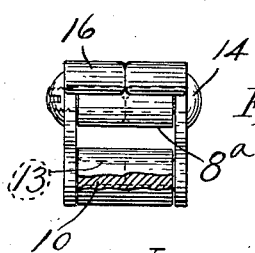

Figure 1 represents a side elevation of a spring constructed in accordance with my invention, showing the same secured to the axle and frame of a vehicle; Fig. 2 represents a similar view of a modification of the invention shown in Fig. 1; Fig. 3 represents a detail of an end of one of the springs shown in the preceding figures; and Fig. 4 represents a detail of the shackle employed to connect the adjacent ends of two spring members.

Describing the parts by reference numerals, 1 represents the frame of a vehicle and 2 the axle thereof. The frame is provided with a pair of hangers, 3 and 4, the latter hanger being shown as a spring hanger. To these two hangers are secured the ends of the upper section 5 of my upper spring member, the said member comprising said upper section and a lower section 6, said sections being secured together back to back at their body portions by means of clips 7. It will be observed that the upper section is relatively lighter, weaker, and preferably shorter, than the lower section, enabling it to flex downwardly upon and cushion against and reinforce the lower section as the latter is deflected under load or by the vehicle wheel striking an obstruction.

The ends of the lower section 6 are connected to the ends of the lower member 8 either in the manner shown in Fig. 1, or as shown in Fig. 2. In the former figure, one end of section 6 is connected to the corresponding end of member 8 by means of a pin or bolt 9 extending through the head and eye in the ends of section 6 and member 8 respectively. The opposite end of section 6 is flexibly connected to the corresponding end of member 8, preferably being formed into a scroll 10 which extends around and below the corresponding end of member 8, and being connected thereto by means of a shackle 11, which will be described hereinafter.

Member 8 is shown as a semi-elliptic spring in Fig. 1. As shown, it is heavier and stiffer than section 6, its strength being about equal to the combined strength of the two sections comprising the upper spring member when said sections are deflected to a certain extent, as will be explained hereinafter. Between the lowermost or shortest leaf of member 8 and the axle 2 is interposed an elongated spring seat 12, which is of substantially the same length as the length of the bottom or shortest leaf of said member, but is curved reversely with respect to the curvature of said plate. This seat engages the lowest leaf of the member 8 gradually as said member is deflected under load or shock and cushions and gradually reinforces said member.

In Fig. 2, the hanger 4ª is shown as a bar instead of a spring and both ends of section 6ª are formed into scrolls extending around and beneath the ends of member 8ª and flexibly connected thereto by means of shackles 11. This construction may be used with the rear axles of vehicles having radius rods. The leaves of the lower spring member in this case are shown as substantially straight,—the spring being subjected to the weight of the unloaded vehicle. This construction, while preserving the same general features of construction as to the upper spring member, brings the frame and center of flexibility of the spring closer to the axle than is the case with the construction shown in Fig. 1 and reduces the effect of side-swaying of the body and frame to a corresponding degree.

The shackle 11 is shown in detail in Fig. 3. The lower end of the shackle is connected to the end of the scroll 10 by means of a pin or bolt 13 and is connected to the end of either of the springs 8 or 8ª by a similar pin or bolt 14 extending through the eye and the end of said spring member.

In order to preserve the proper relation between the ends of the spring members under extreme deflection and under extreme movement of the axle by the radius rods, I provide the upper ends of the two shackle links each with an inwardly projecting boss 15. These bosses will engage the lower surface of the adjacent leaf of the lower spring member and prevent the lower end of the scroll from passing inwardly under the end of the lower spring member to an undesirable extent. A similar pair of inwardly projecting bosses 16 is provided in such position as to engage the upper surface of the adjacent plate of the lower spring member and thus prevent the shackle from capsizing and allowing the lower end of the scroll to pass above the end of the lower spring member. The use of the bosses 15 and 16 allows the ends of the scroll to have a sufficient range of movement with respect to the ends of the lower spring member to accommodate the spring to all ordinary incidents of use without any injury to the tender, flexible scroll ends and at the same time prevents the scroll ends, under any unusual or excessive shock, from assuming positions which may injure the action of the same and the spring section of which they compose a part. They also prevent any disarrangement of the proper relative position of the eye of the scroll and the eye of the lower spring member, under the most violent action of the spring members.

In operation, the upper section of the upper spring member, being the lightest, is deflected the most by the initial or light load, the lower section of the upper member and the lower member being proportionally less deflected. Under a load that will nearly straighten section 5, section 6 acts as a cushion therefor and is itself but slightly deflected. Under heavier load, section 5 begins to bow reversely and increase its bearing on section 6, and the latter section will be deflected more rapidly than before and more rapidly than section 5. The lower member meanwhile is deflected, but not so rapidly as section 6. When section 5 has gotten its full bearing on section 6 (under heavy load) the two sections act as one and the rate of deflection of the upper and lower members is substantially the same. The result is to produce a graduated absorption of load and shocks which will secure ease of riding alike under light and heavy loads and shocks, and in the case of light loads, providing ample reserve strength for emergencies.

The form of lower spring member shown in Fig. 2 is particularly adapted to minimize the tendency of the spring to shear from the axle on encountering an obstruction, the tendency being for the lower spring member to hug the axle and thus resist the shearing effect.

Having thus described my invention, I claim:

1. A spring for vehicles comprising upper and lower spring members, the upper spring member comprising two leaf-spring sections connected back to back, the combined ultimate strength whereof is substantially equal to the strength of the lower spring member, and a flexible connection between at least one end of the lower section of the upper member with an end of the lower spring member, substantially as specified.

2. A spring for vehicles comprising upper and lower spring members, the upper spring member comprising two leaf-spring sections secured together at their body portions and diverging therefrom, the lower section of the upper member being connected to the lower spring member in a manner to permit relative longitudinal movement between at least one of the connected ends thereof and being materially more flexible under light load than the lower spring member, substantially as specified.

3. A spring for vehicles comprising an upper and a lower spring member, the upper spring member comprising two leaf-spring sections secured together at their body portions, the upper section being relatively light and yielding and the lower section being relatively heavy and being connected at its ends to the lower spring member, at least one of said connections being of a nature to permit relative longitudinal movement between the connected parts and the strength of the lower spring member being substantially equal to the combined ultimate strength of the upper spring sections, substantially as specified.

4. The combination of an upper and a lower spring member, and a shackle connecting the corresponding ends of said members, said shackle having spaced projections disposed on opposite sides of one of said spring members and adapted to permit free relative movement between said ends within the range required under normal operation, but adapted to prevent abnormal movement in both directions as under excessive shock, substantially as specified.

5. The combination of an upper and lower spring member, one of said members having an end extending around a corresponding end of the other member, and a connection between said ends permitting free relative movement therebetween, but limiting the extent of such movement in both directions, substantially as specified.

6. The combination of an upper and a lower spring member, one of said members being provided with an end extending around the corresponding end of the other member, and a shackle connecting said ends, said shackle having two spaced bosses adapted to engage opposite portions of the end of one of said members to limit the relative movement of the ends of said members, both inwardly and outwardly, substantially as specified.

7. The combination of an upper and a lower spring member, the upper spring member having a scroll end extending around the corresponding end of the lower member, and a shackle connecting said ends, said shackle being provided with a pair of spaced bosses adapted to engage respectively the upper and the lower surface of the lower spring member to limit the relative movement of the spring ends both inwardly and outwardly, substantially as specified.

8. The combination of an upper and a lower spring member, one of said members having ends extending around the ends of the other member, and shackles connecting the ends of said spring members, said shackles being provided with means for limiting the relative movement of the ends of the spring members both inwardly and outwardly, substantially as specified.

9. The combination of an upper and a lower spring member, one of said members having a scroll end extending around the corresponding end of the other member, and a shackle connecting said ends, said shackle being provided with means for limiting the relative movement of said ends both inwardly and outwardly, substantially as specified.

10. A spring for vehicles comprising an upper and a lower spring member, one of said members comprising two leaf-spring sections secured together at their body portions, one of said sections being relatively light and yielding and the other section being relatively heavy and being connected at its ends to the other spring member, at least one of such connections being of a nature to permit relative longitudinal movement between the connected parts, and the strength of said other spring member being substantially equal to the combined ultimate strength of the sections of the former spring member, substantially as specified.

11. A spring for vehicles comprising an upper and a lower spring member, the upper spring member comprising two leaf-spring sections secured together at their body portions back to back, the upper section being relatively short, light and yielding and the lower section being relatively long and heavy and being connected at its ends to the lower spring member in a manner to permit relative longitudinal movement between at least one pair of such connected ends, the strength of the lower spring member being substantially equal to the combined ultimate strength of the upper spring sections, substantially as specified.

In testimony whereof, I hereunto affix my signature in the presence of two witnesses.

MICHAEL M. McINTYRE.

Witnesses:
  J. B. Hull,
  S. E. Fouts.

---

Copies of this patent may be obtained for five cents each, by addressing the "Commissioner of Patents, Washington, D. C."